US009342786B2

(12) United States Patent
Krause et al.

(10) Patent No.: US 9,342,786 B2
(45) Date of Patent: May 17, 2016

(54) METHOD AND SYSTEM FOR PARALLEL BATCH PROCESSING OF DATA SETS USING GAUSSIAN PROCESS WITH BATCH UPPER CONFIDENCE BOUND

(71) Applicant: California Institute of Technology, Pasadena, CA (US)

(72) Inventors: Andreas Krause, Zurich (CH); Thomas Desautels, Pasadena, CA (US); Joel W. Burdick, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 303 days.

(21) Appl. No.: 13/919,757

(22) Filed: Jun. 17, 2013

(65) Prior Publication Data

US 2013/0339287 A1    Dec. 19, 2013

Related U.S. Application Data

(60) Provisional application No. 61/660,110, filed on Jun. 15, 2012.

(51) Int. Cl.
*G06N 5/04* (2006.01)
*G06N 5/02* (2006.01)

(52) U.S. Cl.
CPC . *G06N 5/025* (2013.01); *G06N 5/04* (2013.01)

(58) Field of Classification Search
None
See application file for complete search history.

(56) References Cited

U.S. PATENT DOCUMENTS

| 7,620,502 | B2 * | 11/2009 | Selifonov et al. | 702/19 |
| 2009/0024997 | A1 * | 1/2009 | Kobayashi | 718/101 |
| 2010/0094800 | A1 * | 4/2010 | Sharp | 706/55 |
| 2012/0271372 | A1 * | 10/2012 | Osorio | 607/17 |

OTHER PUBLICATIONS

A. Krause and C. Guestrin. Near-optimal nonmyopic value of information in graphical models. In UAI, 2005.
A. Krause and C. S. Ong. Contextual gaussian process bandit optimization. In Advances in Neural Information Processing Systems (NIPS), 2011.
A. Krause, A. Singh, and C. Guestrin. Near-optimal sensor placements in gaussian processes: Theory, efficient algorithms and empirical studies. Journal of Machine Learning Research (JMLR), 9:235-284, Feb. 2008.

(Continued)

*Primary Examiner* — Kakali Chaki
*Assistant Examiner* — Mai T Tran
(74) *Attorney, Agent, or Firm* — Seth D. Levy; Jason Kunze; Nixon Peabody LLP (57) ABSTRACT

A method and system for selecting a batch of input data from available input data for parallel evaluation by a function is disclosed. The function is modeled as drawn from a Gaussian process. Observations are used to determine a mean and a variance of the modeled function. An upper confidence bound is determined from the determined mean and variance. A decision rule is applied to select input data from the available input data to add to the batch of input data. The selection of the input data is based on a domain-specific time varying parameter. Intermediate observations are hallucinated within the batch. The hallucinated observations are used with the decision rule to select subsequent input data from the available input data for the batch of input data. The input data of the batch is evaluated in parallel with the function. The resulting determined data outputs are stored.

26 Claims, 4 Drawing Sheets

(56) References Cited

OTHER PUBLICATIONS

C. E. Rasmussen and H. Nickisch. Gaussian processes for machine learning (gpml) toolbox. The Journal of Machine Learning Research, 11:3011-3015, 2010.

C. Widmer, N. Toussaint, Y. Altun, and G. Ratsch. Inferring latent task structure for multitask learning by multiple kernel learning. BMC Bioinformatics, 11(Suppl 8:S5), 2010.

D. Ginsbourger, R. Riche, and L. Carraro. Kriging is well-suited to parallelize optimization. In Y. Tenne and C.-K. Goh, editors, Computational Intelligence in Expensive Optimization Problems, vol. 2 of Adaptation, Learning, and Optimization, pp. 131-162. Springer Berlin Heidelberg, 2010.

D. Lizotte, T. Wang, M. Bowling, and D. Schuurmans. Automatic gait optimization with Gaussian process regression. In IJCAI, pp. 944-949, 2007.

D. R. Jones, M. Schonlau, and W. J. Welch. Efficient global optimization of expensive black-box functions. J Glob. Opti., 13:455-492, 1998.

E. Brochu, M. Cora, and N. de Freitas. A tutorial on Bayesian optimization of expensive cost functions, with application to active user modeling and hierarchical reinforcement learning. In TR-2009-23, UBC, 2009.

H. Robbins. Some aspects of the sequential design of experiments. Bull. Amer. Math. Soc., 58 (1952), 527-535.

I. O. Ryzhov, W. B. Powell, and P. I. Frazier. The knowledge gradient algorithm for a general class of online learning problems. Operations Research, 60(1):180-195, 2012.

J. Abernethy, E. Hazan, and A. Rakhlin. Competing in the dark: An efficient algorithm for bandit linear optimization. In Proceedings of the 21st Annual Conference on Learning Theory (COLT), 2008.

J. Azimi, A. Fern, and X. Fern. Batch bayesian optimization via simulation matching. In Advances in Neural Information Processing Systems (NIPS), 2010.

J. Azimi, A. Fern, X. Fern, G. Borradale, and B. Heeringa. Batch active learning via coordinated matching. In Proceedings of the 29th International Conference on Machine Learning, 2012.

J. Azimi, A. Jalali, and X. Fern. Hybrid batch bayesian optimization. In Proceedings of the 29th International Conference on Machine Learning, 2012.

J. Gittins. Bandit processes and dynamic allocation indices. Journal of the Royal Statistical Society, B, 41(2):148-177, 1979.

L. Kocsis and C. Szepesvári. Bandit based monte-carlo planning in ECML, 2006.

M. Dudik, D. Hsu, S. Kale, N. Karampatziakis, J. Langford, L. Reyzin, and T. Zhang. Efficient optimal learning for contextual bandits. In UAI, 2011.

Minoux, M. Accelerated greedy algorithms for maximizing submodular set functions. Optimization Techniques, LNCS, pp. 234-243,1978.

N. Srinivas, A. Krause, S. Kakade, and M. Seeger. Gaussian process optimization in the bandit setting: No regret and experimental design. In Proceedings of the 27th International Conference on Machine Learning, 2010.

P. Auer, N. Cesa-Bianchi, and P. Fischer. Finite-time analysis of the multiarmed bandit problem. Mach. Learn., 47(2-3):235-256, 2002.

P. Auer. Using confidence bounds for exploitation-exploration tradeoffs. JMLR, 3, 2002.

P. Hennig and C. J. Schuler. Entropy search for information-efficient global optimization. Journal of Machine Learning Research (JMLR), 13:1809-1837, Jun. 2012.

R. Kleinberg, A. Slivkins, and E. Upfal. Multi-armed bandits in metric spaces. In STOC, pp. 681-690, 2008.

Rasmussen, C. E. and Williams, C. K. I. Gaussian Processes for Machine Learning. MIT Press, 2006.

S. Bubeck, R. Munos, G. Stoltz, and C. Szepesvári. Online optimization in X-armed bandits. In Advances in Neural Information Processing Systems (NIPS), 2008.

S. Bubeck, R. Munos, and G. Stoltz. Pure exploration in multi-armed bandits problems. In ALT, 2009.

V. Dani, T. P. Hayes, and S. M. Kakade. Stochastic linear optimization under bandit feedback. In Proceedings of the 21st Annual Conference on Learning Theory (COLT), 2008.

\* cited by examiner

METHOD AND SYSTEM FOR PARALLEL BATCH PROCESSING OF DATA SETS USING GAUSSIAN PROCESS WITH BATCH UPPER CONFIDENCE BOUND

PRIORITY

The present application claims priority to U.S. Provisional Application 61/660,110 filed on Jun. 15, 2012, which is hereby incorporated by reference in its entirety.

FEDERAL SUPPORT STATEMENT

The subject matter of this invention was made was made with government support under NS062009 awarded by the National Institutes of Health and under IIS0953413 awarded by the National Science Foundation and FA8650-11-1-7156 awarded by USAF/ESC. The government has certain rights in the invention.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to efficient selection of input data for maximizing a reward from a function, and more particularly, to a system for selecting a batch of input data for parallel evaluation to obtain optimal outputs from a function.

BACKGROUND

Many problems involving correlating inputs require optimizing an unknown reward function from which only noisy observations may be obtained. For example, in the field of spinal therapy, there may be multiple electrodes placed in different locations on the spine. Determining the optimal location and polarities (cathode or anode) of the multiple electrodes for the most optimal response from electrical stimulation involves testing multiple combinations of locations and electrodes for outputs that reflect both reactions and noise. Analyzing the output of the function is used to continue to refine the input data sets to obtain the optimal location of electrodes to maximize desired attributes of the stimulus response.

A central challenge is choosing actions that both explore (estimate) a function and exploit knowledge about likely high reward regions for determining the best results based on the function. Carefully calibrating this exploration-exploitation tradeoff in selecting input data is especially important in cases where the experiments are costly in some sense, e.g., when each experiment takes a long time to perform and the time window available for experiments is short. This approach relies on the completion of a first experiment before other values may be tested, but such an approach requires time to conduct multiple trials which rely on the results of the previous trials.

In many applications, it is desirable to select of a batch of input data to be evaluated in parallel, which increases the speed of obtaining solutions since the many inputs constituting a batch may be tested simultaneously. By parallelizing the experiments, substantially more information may be gathered in the same time frame, however, future actions must be chosen without the benefit of intermediate results. This involves choosing groups of experiments to run simultaneously. The challenge is to assemble groups of experiments which both explore the function and exploit what are currently known to be high-performing regions. This challenge is significant when dealing with the combinatorially large set of possible data inputs. Further, the statistical question of quantitatively how the algorithm's performance depends on the size of the batch (i.e., the degree of informational parallelism) is important to resolve.

Exploration-exploitation tradeoffs have been studied in context of the multi-armed bandit problem, in which a single action is taken at each round, and a corresponding (possibly noisy) reward is observed. Early work has focused on the case of a finite number of decisions and payoffs that are independent across the arms. In this setting, under some strong assumptions, optimal policies can be computed.

Optimistic allocation of actions according to upper-confidence bounds (UCB) on the payoffs has proven to be particularly effective. Recently, approaches for coping with large (or infinite) sets of decisions have been developed. In these cases, dependence between the payoffs associated with different decisions must be modeled and exploited. Examples include bandits with linear or Lipschitz-continuous payoffs or bandits on trees. The exploration-exploitation tradeoff has also been studied in Bayesian global optimization and response surface modeling, where Gaussian process models are often used due to their flexibility in incorporating prior assumptions about the payoff function One natural application is the design of high-throughput experiments, where several experiments are performed in parallel, but only receive feedback after the experiments have concluded. In other settings, feedback may be received only after a delay. To enable parallel selection, one must account for the lag between decisions and observations. Most existing approaches that can deal with such delay result in a multiplicative increase in the cumulative regret as the delay grows. Only recently, methods have demonstrated that it is possible to obtain regret bounds that only increase additively with the delay (i.e., the penalty becomes negligible for large numbers of decisions). However, such approaches only apply to contextual bandit problems with finite decision sets, and thus not to settings with complex (even nonparametric) payoff functions.

There is therefore a need for a method to select a batch of input data for numerous evaluations of a function performed in parallel to maximize reward. There is also a need for a system to use existing Gaussian process models with upper confidence bounds in order to select a batch of input data without relying on previous evaluation output data. There is a further need to provide a process for selecting a batch with a variable length for function evaluation in parallel.

SUMMARY

According to one example, a method of selecting a batch of input data from available input data for parallel evaluation by a function is disclosed. The function is modeled as drawn from a Gaussian process. Observations are used to determine a mean and a variance of the modeled function. An upper confidence bound is determined from the determined mean and variance. A decision rule is applied to select input data from the available input data to add to the batch of input data. The selection is based on a domain-specific time varying parameter. Intermediate observations are hallucinated within the batch. The hallucinated observations with the decision rule are used to select subsequent input data from the available input data for the batch of input data. The input data of the batch is evaluated in parallel with the function. The resulting determined data outputs are stored in a memory device.

Another example is a system for selecting a batch of input data from available input data for parallel evaluation by a function. The system includes a storage device including a database storing the available input data and a controller coupled to the storage device. The controller is operable to model the function as drawn from a Gaussian process. The controller is operable to use observations to determine a mean and a variance of the modeled function and determine an upper confidence bound from the determined mean and variance. The controller applies a decision rule to select input data from the available input data to add to the batch of input data, wherein the selection is based on a domain-specific time varying parameter. The controller hallucinates intermediate observations within the batch and selects subsequent input data from the available input data for the batch of input data using the hallucinated observations with the decision rule. The controller evaluates the input data of the batch in parallel with the function and stores the resulting determined data outputs.

Another example is a non-transitory, machine readable medium having stored thereon instructions for selecting a batch of input data from available input data for parallel evaluation by a function. The instructions, when executed by at least one machine processor, cause the machine to model the function as drawn from a Gaussian process. The instructions cause the machine to use observations to determine a mean and a variance of the modeled function and determine an upper confidence bound from the determined mean and variance. The instructions cause the machine to apply a decision rule to select input data from the available input data to add to the batch of input data, wherein the selection is based on a domain-specific time varying parameter. The instructions cause the machine to hallucinate intermediate observations within the batch and select subsequent input data from the available input data for the batch of input data using the hallucinated observations with the decision rule. The instructions cause the machine to evaluate the input data of the batch in parallel with the function.

Additional aspects of the invention will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
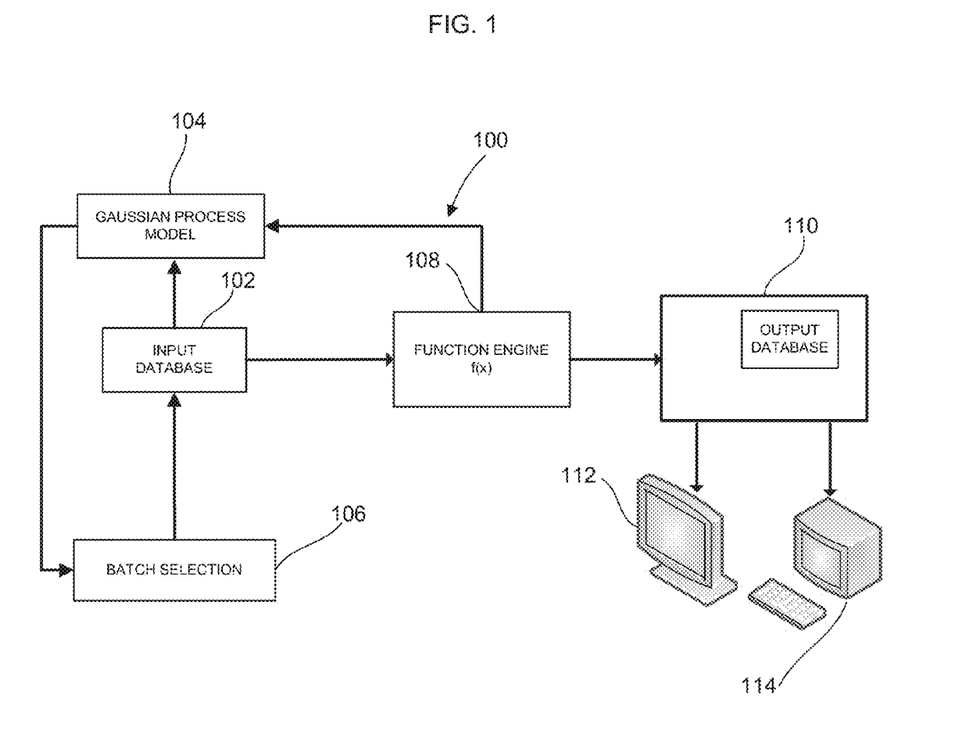
FIG. 1 is a block diagram of a system to make selection of batches of input data for parallel evaluation in a function.

FIG. 1 shows a system 100 that optimizes processing a batch of input data for parallel evaluation by a function f. The system 100 selects a batch of input data from available input for evaluating the optimal outputs of the function, f, based on multi-variable data inputs. The system 100 includes a database 102 that stores available input data. The available input data may be derived from different possible values from inputs such as physical locations and dimensions, chemical compositions, electrical levels, etc. The system 100 determines which available inputs for assembling a batch to result in optimal outputs from the function, f. A Gaussian model determination module 104 outputs a model of the function as drawn from a Gaussian process. The Gaussian model determination module 104 uses observations to determine a mean and a variance. The module 104 determines an upper confidence bound from the determined mean and variance. A batch selection engine 106 is coupled to the input database 102 and the Gaussian process model engine 104. The results of the Gaussian determination module 104 are used by the batch selection engine 106 to apply a decision rule to select input data from the available input data to add to the batch of input data for evaluation that will have a high probability of obtaining the optimal outputs via algorithms which will be described below. Immediate observations are hallucinated from the batch without actual feedback from outputs based on the inputs. The hallucinated observations with the decision rule are used by the batch selection engine 106 to select subsequent input data from the available input data for the batch of input data.

The system 100 includes a function evaluation engine 108 for evaluating the output of the function, f. The batch of input data selected by the function evaluation engine 108 may be evaluated in parallel for the function, f, by the function evaluation engine 108. The function evaluation engine 108 is coupled to a memory device 110 that includes an output database. The batches of input data selected from the batch selection engine 106 are processed in parallel by the function evaluation engine 108 without relying on sequential feedback for each individual batch from the evaluation of a previous batch. The outputs of the function evaluation engine 108 are stored in the output database. The resulting data provides the optimal inputs for maximizing the reward (output) of the function, f. Additional real feedback may be provided from the results of the function evaluation engine 108 on further selections of additional batches of input data to further maximize the reward of the function. Such feedback may be delayed to speed the processing.

The memory 110 may store additional correlation data with the batches of input data producing optimal outputs from the function, f. A display device 112 is coupled to the memory 110 to display correlation between a batch of input data and the outputs of the function, f to a user from the memory 110. The resulting correlation data may be used for optimizing the operation of the function such as by selecting physical positioning or input values for operation of a device, selection of compositions for a formulation, etc. A control workstation 114 may also be coupled to the memory device 110 for using the correlated data in the memory 110 to optimize the operation of a device using the function. The system 100 may be applied for functions where: 1) simulation is possible based on first principles/a reasonable model; 2) the desired phenomena are complex, chaotic, emergent, or uncertain without executing the simulation; and 3) success is quantifiable upon receipt of the simulation results. The system 100 may also be run on a continuous basis to determine optimal inputs when the function changes over time.

The process of the system 100 begins with a Gaussian characterization of the function, f by the Gaussian process module 104. As is known, a Gaussian process is a probability distribution across a class of typically smooth functions, which is parameterized by a kernel function k(x, x'), which characterizes the smoothness of the function, f, and a prior mean function μ(x), which is, for notational simplicity, assumed to be μ(x)=0 without loss of generality. The function, f, is modeled from such a Gaussian process. It is assumed that the noise is independent identically distributed ("i.i.d.") Gaussian. Conditioned on a set of observations $y_{1:t-1}$ [$y_1, \ldots, y_{t-1}$] corresponding to X=($x_1, \ldots, x_{t-1}$) at any x∈D, the Gaussian posterior is f(x)y1:t-1~N ($\mu_{t-1}(x), \sigma^2_{t-1}(x)$), where:

$$\mu_{t-1}(x) = k[K + \sigma_n^2 I]^{-1} y_{1:t-1} \quad (1) \text{ and}$$

$$\sigma^2_{t-1}(x) = k(x;x) - k[K + \sigma_n^2 I]^{-1} kT \quad (2)$$

where, $\mu_{t-1}(x)$ is the mean and $\sigma_{t-1}(x)$ is the standard deviation, k=k (x,X) is the row vector of kernel evaluations between x and X and K=K (X,X) is the matrix of kernel evaluations between past observations.

The maximum mutual information between the payoff function, f and observations $y_A$ of any set A⊆D of the T decisions evaluated up until time T is defined as $$\gamma_T = \max_{A \in D, |A| \leq T} I(f; y_A).$$

In the Gaussian Process model, the conditional mutual information gain of a set of potential observations with respect to the payoff function measures the degree to which acquiring these observations will influence the model. The conditional mutual information gain of a set of observations $y_A$ of a set A={$x_t, \ldots, x_T$} with respect to f, given observations $y_{t-1}$ is $$I(f; y_A | y_{t-1}) = \sum_{\tau=t}^{T} \log(1 + \sigma_n^{-2} \sigma^2_{\tau-1}(x_\tau)).$$

This sum may be calculated solely by knowing A, without needing the actual values of the observation as, $y_A$.

The modeling of the function, f, as a sample from a Gaussian process by the Gaussian process module 104 in FIG. 1 quantifies predictive uncertainty. This may be used to guide exploration and exploitation. A selection rule for inputs is used to guide exploration and exploitation. Such a process may be based on a Gaussian process upper confidence bound (GP-UCB) selection rule such as:

$$X_t = \underset{x \in D}{\mathrm{argmax}} [\mu_{t-1}(x) + \alpha_t^{1/2} \sigma^2_{t-1}(x)] \quad (3)$$

This decision rule uses $\alpha_t$, a domain-specific time-varying parameter, to trade off exploitation (sampling x with high mean) and exploration (sampling x with high standard deviation) by changing the relative weighting of the posterior mean and standard deviation, respectively $\mu_{t-1}(x)$ and $\sigma_{t-1}(x)$ from Equations (1) and (2) above. With a proper choice of the domain-specific time varying parameter, $\alpha_t$, the cumulative regret of the upper confidence bound grows sub-linearly for many commonly used kernel functions, providing the first regret bounds and convergence rates for Gaussian process optimization.

Implicit in the definition of the decision rule, is the corresponding confidence interval, $C_t^{seq}$, where this confidence interval's upper confidence bound is the value of the argument of the decision rule. For this (or any) confidence interval, the difference between the uppermost limit and the lowermost limit is the width w, which in this example is $2\alpha_t^{1/2} \sigma^2_{t-1}(x)$. This confidence interval is based on the posterior over the function, f, given $y_{1:t-1}$. A new confidence interval is created for round t+1 after adding $y_t$ to the set of observations. The time domain parameter, $\alpha_t$ is selected such that a union bound over all t≥1 and x∈D yields a high-probability guarantee of confidence interval correctness. It is this guarantee which enables the construction of high-probability regret bounds. The cumulative regret of the selection rule may be bounded (up to logarithmic factors) as $R_T = O^*(\sqrt{T \alpha_T \gamma_T})$ where $\alpha_T$ is the confidence interval width multiplier described above and $\gamma_T$ is the maximum mutual information between the payoff function f and the observations $y_{1:T}$. For many commonly used kernel functions, $\gamma_T$ grows sub-linearly and $\alpha_T$ only needs to grow poly-logarithmically in T, implying that $R_T$ is also sub-linear. Thus $R_T/T \to 0$ as $T \to \infty$. Thus, the decision rule in equation (3) is a no-regret algorithm.

As will be detailed below, the performance of the decision rule may be generalized to batch and parallel selection (i.e., B>1). In order to address a diverse set of inputs while relying upon only outdated feedback, a Gaussian process—Batch Upper Confidence Bound (GP-BUCB) algorithm of the batch selection module 106 of the system 100 encourages diversity in exploration, uses past information in a principled fashion, and yields strong performance guarantees. The GP-BUCB algorithm may also be modified to a Gaussian process—Adaptive Upper Confidence Bound (GP-AUCB) algorithm, which retains the theoretical guarantees of the GP-BUCB algorithm but creates batches of variable length in a data-driven manner as will be explained below.

The Gaussian Process-Batch Upper Confidence Bound (GP-BUCB) algorithm in this example encourages diversity in exploration and has strong performance guarantees. A key property of Gaussian processes is that the predictive variance in equation (2) above only depends on where the observations are made (X=($x_1, \ldots x_{t-1}$)), but not which values were actually observed ($Y_{1:t-1}$=[$y_1, \ldots, y_{t-1}$]$^T$). Thus, it is possible to compute the posterior variance used in the sequential GP-UCB score, even while previous observations are not yet available. To do so, observations are hallucinated for every observation not received ($Y_{1:t-1}$=[$\mu(x_{fb[t]+1}), \ldots, \mu(x_{t-1})$]). The approach towards parallel exploration alters equation (3) to sequentially choose decisions within the batch as $$X_t = \underset{x \in D}{\mathrm{argmax}} \sigma^2_{t-1}(x) \quad (4)$$

The role of the domain-specific time-varying variable, $\beta_t$ is analogous to that of $\alpha_t$, in the GP-UCB algorithm in equation (3). The confidence interval for the GP-BUCB algorithm has a width of $2\beta_t^{1/2} \sigma^2_{t-1}(x)$. This approach naturally encourages diversity in exploration by taking into account the change in predictive variance since the payoffs of "similar" decisions have similar predictive distributions, exploring one decision will automatically reduce the predictive variance of similar decisions.

One example of a subroutine to implement the GP-BUCB algorithm is as follows:

```
Input: Decision set D, GP prior μ_0, σ_0, kernel function k(. , .)
for t = 1, 2, ...., T do
    Choose x_t = argmax_{x ∈ D}[μ_fb[t] (x) + β_t^{1/2} σ_{t-1} (x)]
    Compute σ_t (.)
    if t = fb[t + 1] then
        Obtain y_t' = f(x_t') + ε_t' for t' ∈ {fb, ...., t}
        Perform Bayesian inference to obtain μ_t (.)
    end if
end for
```

The confidence intervals used in this approach are predicated on having information from the early decisions in the batch. Since that information is not currently available, the confidence intervals are "overconfident" about the knowledge of the function, f, at those locations. This overconfidence requires compensation in a principled manner. As will be explained below, one approach to doing so is to increase the width of the confidence intervals (through proper choice of $\beta_t$), such that the confidence intervals used by the GP-BUCB algorithm are conservative, i.e. they contain the true function f(x) with high probability.

Figure 2A:
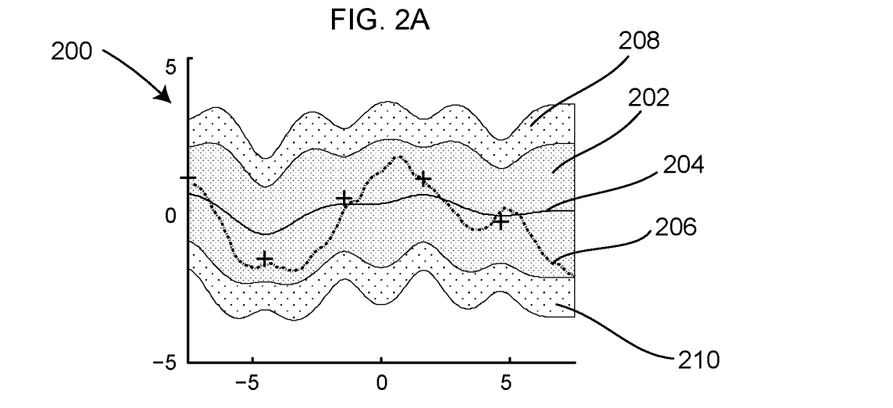
FIG. 2A-2C are graphs of successive steps during the parallel selection of batches of input data in FIG. 1 resulting in different confidence bounds.
Figure 2B:
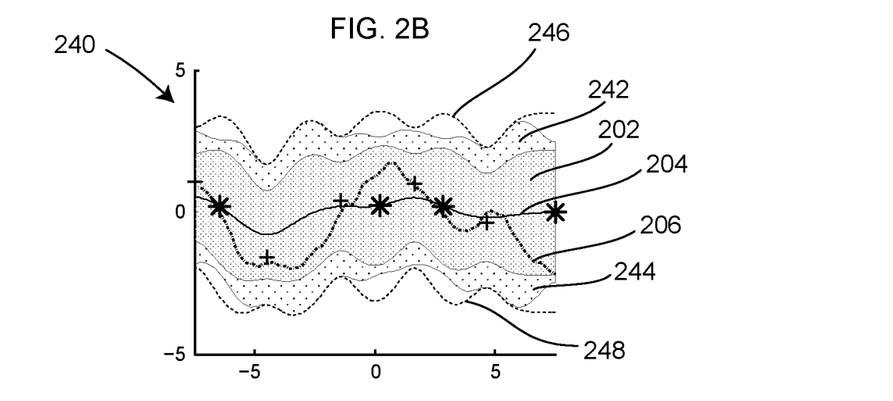
Figure 2C:
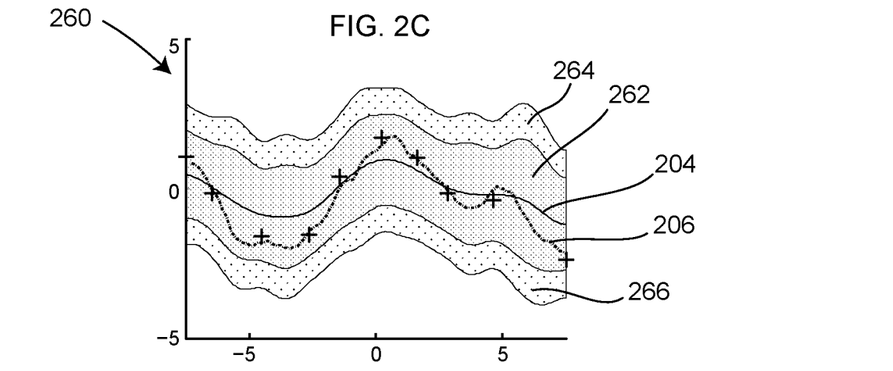

FIG. 2A-2C are graphs showing the selection of confidence bounds to compensate for overconfidence in the GP-BUCB algorithm. FIG. 2A illustrates a state of knowledge based on only real observations (shown as black crosses). FIG. 2B illustrates a state of knowledge incorporating real and hallucinated (shown as black stars) observations. FIG. 2C illustrates a state of knowledge in which real observations have replaced the hallucinated placeholders of FIG. 2B. FIG. 2A is a graph 200 showing confidence intervals in dark areas 202 which are computed from previous noisy observations shown as the crosses at the beginning of a batch. The crosses shape the posterior mean represented by a line 204. The true, unknown function f(x) is represented by the dashed line 206. To avoid overconfidence, the GP-BUCB algorithm chooses batches using the confidence intervals represented by the areas 208 and 210 such that even in the worst case, the succeeding confidence intervals in the batch will contain the confidence intervals 202.

FIG. 2B is a graph 240 showing the last decisions from the end of a batch in begun in FIG. 2A. Like elements such as the posterior mean 204 and the function f(x) 206 in FIG. 2A are labeled identically in FIG. 2B. As shown in FIG. 2B, the hallucinated observations are designated as stars and are used to shrink the outer posterior confidence intervals shown in areas 242 and 244 from their comparative values at the start of the batch represented by the dashed lines 246 and 248. The areas 242 and 244 still contain the confidence intervals 202 as desired.

FIG. 2C is a graph 260 that shows the beginning of the next batch after decisions from the previous batch in FIGS. 2A-2B. Like elements such as the posterior mean 204 and the function f(x) 206 in FIG. 2A are labeled identically in FIG. 2C. The feedback from all decisions is obtained and new confidence intervals represented by an area 262 and corresponding batches represented by areas 264 and 266 are computed.

One major computational bottleneck of applying GP-BUCB is calculating the posterior mean $\mu_t(x)$ and variance, $\sigma_t^2(x)$ for the candidate decisions. The mean is updated only whenever feedback is obtained, and upon computation of the Cholesky factorization of $K(X;X)+\sigma_n^2 I$ which is necessary whenever new feedback arrives, predicting $\mu_t(x)$ requires O(t) additions and multiplications. In contrast, $\sigma_t^2(x)$ must be recomputed for every x in D after every single round, and requires solving back-substitution, which requires $O(t^2)$ computations. Therefore, the variance computation dominates the computational cost of the GP-BUCB algorithm.

However, for any fixed decision x, $\sigma_t^2(x)$ is monotonically decreasing in t. This fact can be exploited to dramatically improve the running time of GP-BUCB, at least for finite (or when using discretizations of the) decision sets D. Instead of re-computing $\sigma_{t-1}(x)$ for all decisions x in every round t, an upper bound, $\hat{\sigma}_{t-1}(x)$, may be maintained which is initialized to $\sigma_0=\infty$. In every round, the GP-BUCB rule is applied with the upper bound to identify $x_t$ of the upper bound, such that the decision rule is:

$$x_t = \underset{x \in D}{\operatorname{argmax}}[\mu_{fb[t]}(x) + \beta_t^{1/2} \hat{\sigma}_{t-1}(x)] \quad (5)$$

The upper bound is recomputed $\hat{\sigma}_{t-1}(x) \leftarrow \sigma_{t-1}(x)$, If $x_t$ still lies in the argmax of equation 5, the next decision to be made is identified and $\hat{\sigma}_t(x)$ is set to $\hat{\sigma}_{t-1}(x)$ for all remaining decisions x in the batch. This concept of "lazy" variance calculation leads to dramatically improved computational speeds since the variance, $\sigma_t^2$, does not have to be recalculated for each decision.

As explained above, proper choice of $\beta_t$ such that the confidence intervals used by the GP-BUCB algorithm contain the true function f(x) with high probability is necessary. The choice for $\beta_t$ is made based on the assumption that for a function f sampled from a known Gaussian process prior with known noise variance, $\sigma_n^2$, the ratio of $\sigma_{fb(t)}(x)$ to $\sigma_{t-1}(x)$ is bounded as:

$$\sigma_{fb(t)}(x)/\sigma_{t-1}(x) \le \exp(I(f;y_{fb[t]+1:t-1}|y_{1;fb[t]})) \quad (6)$$

Therefore, the relative amount by which the confidence intervals can shrink with respect to decision x is bounded by the worst-case (greatest) mutual information I (f; $y_{fb[t]+1:t-1}|y_{1;fb[t]}$) obtained during selection of $x_{fb[t]+1:t-1}$, for those decisions for which feedback is not available. Thus, if a constant bound, C, is applied on the maximum conditional mutual information that can be accrued within a batch, it may be used to guide the choice of $\beta_t$ to ensure that the algorithm is not overconfident.

The machinery of the upper confidence bound algorithm may be used to derive the regret bound. The main result bounds the regret of the GP-BUCB algorithm in terms of a bound, C, on the maximum conditional mutual information. It holds under any of three different assumptions about the payout function f, which may all be of interest. In particular, it holds even if the assumption that f is sampled from a GP is replaced by the assumption that f has low norm in the Reproducing Kernel Hilbert Space (RKHS) associated with the kernel function.

Given an upper bound, C on the conditional mutual information gain arising from any batch with respect to f(x) for any x in D, and given that the problem conditions and the scheduling of $\alpha_t$ satisfy one of three sets of conditions (listed below), then, with probability at least 1-δ, where δ∈(0,1), any algorithm using the GP-BUCB decision rule with $\beta_t$=exp(2C) $\alpha_{fb[t]}$ suffers regret no more than $R_T \le \sqrt{C_1 T \exp(2C) \alpha_T \gamma_T}$+2.

These sets of assumptions are respectively: Set 1) D is a finite set, f is sampled from a known Gaussian Process prior with known noise variance and $\alpha_t$=2 log(|D|$t^2\pi^2$/(6δ)); Set 2) D is a compact and convex set in $[0, 1]^d$, f is sampled from a known Gaussian Process prior with known noise variance, k(x,x') satisfies a probabilistic smoothness condition on sample paths which involves parameters a and b, and $\alpha_t$=2 log($t^2 2\pi^2$/(3δ))+2d log($t^2$ dbl(log(4da/δ))$^{1/2}$); and Set 3) D is arbitrary, f has an RKHS norm bounded by a constant M, the noise on the observations forms an arbitrary martingale difference sequence, uniformly bounded by $\sigma_n$, and $\alpha_t = 2M^2 + 300\gamma_t \ln^3(t/\delta)$.

The functional significance of a bound C on the information hallucinated with respect to any f(x) arises through this quantity's ability to bound the degree of contamination of the confidence intervals of the GP-BUCB algorithm with hallucinated information. Two properties of the mutual information are particularly useful. These properties are monotonicity (adding an element x to the set A cannot decrease the mutual information between f and the corresponding set of observations $y_A$) and submodularity (the increase in mutual information between f and $y_A$ with the addition of an element x to set A cannot be greater than the corresponding increase in mutual information if x is added to A', where $A' \subseteq A$).

The amount of information with respect to f(x) hallucinated within any batch may be bounded by several quantities. Two particularly useful bounds are given in the following series of inequalities:

$$I(f(x); y_{fb[t]+1:t-1} | y_{1:fb[t]}) \leq I(f; y_{fb[t]+1:t-1} | y_{1:fb[t]}) \leq \gamma_{B-1} \quad (7)$$

where B is the batch size or delay length. These imply that the GP-BUCB algorithm may ensure a bound on the conditional mutual information gain with respect to f(x) by bounding the global conditional mutual information gain (i.e., the information gained with respect to f as a whole) or by noting that the information which can be gained by a set of B−1 observations can only decrease (submodularity), and $\gamma_{B-1}$ can be calculated using only knowledge of the kernel function.

In the GP-BUCB algorithm described above, the local information gain with respect to any f(x), x∈D, t∈N is bounded by fixing the feedback times and then bounding the maximum conditional mutual information with respect to the entire function f which can be acquired by any algorithm which chooses any set of B−1 or fewer observations. While this argument uses multiple upper bounds, any or all of which may be overly conservative, this approach is still applicable because such a bound C holds for any possible algorithm for constructing batches. It is otherwise quite difficult to disentangle the role of C in setting the exploration-exploitation tradeoff parameter $\beta_t$ from its role as a bound on how much information is hallucinated by the algorithm, since a larger value of C (and thus $\beta_t$) typically produces more information gain by promoting exploration under the GP-BUCB decision rule, in Equation (4).

Since the bound C is related to the maximum amount of conditional mutual information which could be acquired by a set of B−1 actions, C grows monotonically with B. With a larger set of pending actions, there is more potential for explorations which gain additional information. One easy upper bound for the information gained in any batch may be derived as follows. Since mutual information is submodular, and thus the maximum conditional mutual information which can be gained by any set of observations is maximized when the set of observations so far obtained is empty. Letting the maximum mutual information with respect to f which may be obtained by any observation set of size B−1 be denoted $\gamma_{B-1}$ and choosing $C = \gamma_{B-1}$ provides a bound on the possible local conditional mutual information gain for any t∈N and x∈D.

The selection of domain-specific time-varying variable, $\beta_t$, using the processes explained above in relation to C may not be necessary for numerous applications. The domain-specific time-varying variable, $\beta_t$ in certain applications may be similar to the parameter, $\alpha_t$, used in the decision rule in equation (3) with an additional small multiplier applied such that the GP-BUCB algorithm is more aggressive than theoretically allowable at the price of the regret bound.

To obtain regret bounds independent of batch size B, the monotonicity properties of conditional mutual information may be exploited. This can be done structuring GP-BUCB as a two-stage procedure. First, an initialization set $D^{init}$ of size $|D^{init}| = |D^{init}| = \{x_1^{init}, \ldots, x_{Tinit}^{init}\}$ is selected non-adaptively (i.e., without any feedback). Following the selection of this entire set, feedback $y^{init}$ for all decisions in $D^{init}$ is obtained. In the second stage, the GP-BUCB algorithm is applied to the posterior Gaussian process distribution, conditioned on $y^{init}$. The regret of the two-stage algorithm is bounded by $R_T = O(T_{init} + \sqrt{T\gamma_T^{init}\alpha_T \exp(2C)})$, where $\gamma_T^{init}$ is the maximum conditional mutual information gain which can result from the post-initialization acquisition of a set of observations of size T. The initialization process can also be terminated adaptively, by stopping whenever the conditional mutual information which could be gained by any subsequent set of B queries which could possibly be constructed is driven below C; one sufficient condition for this is if the posterior standard deviation for every x in D is below a corresponding threshold.

The initialization set $D^{init}$ is constructed via uncertainty sampling. The process starts with $D^{init}_0 = \{\}$, and for each $t = 1, \ldots, T^{init}$ the most uncertain decision is determined as $$x_t^{init} = \underset{x \in D}{\mathrm{argmax}}\, \sigma_{t-1}^2(x)$$

and $D^{init}_t = D^{init}_{t-1} \cap x^{init}_t$. Uncertainty sampling is a special case of the GP-BUCB algorithm with a constant prior mean of 0 and the requirement that for all $1 \leq t \leq T^{init}$, fb[t]=0, i.e., no feedback is taken into account for the first $T^{init}$ iterations. Under the above procedure, if uncertainty sampling is used to generate an initialization set $D^{init}$ of size $T^{init}$, then $\gamma_{B-1}^{init} \leq (B-1)\gamma_{Tinit}/(T_{init})$. Whenever $\gamma_T$ is sublinear in T (i.e., $\gamma_T = o(T)$), then the bound on $\gamma_{B-1}^{init}$ converges to zero for sufficiently large $T^{init}$. For any constant C>0, $T^{init}$ may be chosen as a function of B such that $\gamma^{init}_{B-1} < C$. Using this choice of C bounds the post-initialization regret. In order to derive bounds on $T^{init}$, a bound on $\gamma_T$ which is analytical and sublinear is required.

For the Squared Exponential, Matérn, and Linear kernels, such bounds on $\gamma_T$ exist and so $T^{init}$ can be shown to be finite in these cases. Practically, initialization should be stopped when there exists no batch of size B which would include too much hallucinated information regarding the function at any point; one sufficient condition is when there does not exist an x∈D such that $$\frac{(B-1)}{2} \log(1 + \sigma_n^{-2}\sigma_t^2(x)) \geq C.$$

The analysis above shows that this will occur with a finite number of observations for particular kernels. Given that this initialization condition is satisfied, the total regret of the initialization and subsequent run of GP-BUCB is bounded by $R_T \leq C^8 R_{T-Tinit}^{seq} + 2\|f\|_{sc} T_{init}$ with probability 1−δ, where $R_T^{seq}$ is the regret of the GP-UCB algorithm run τ rounds with $\alpha_t$ dictated by the problem conditions and δ.

While the analysis of the GP-BUCB algorithm above uses feedback mappings fb[t] specified by the problem instance, it may be useful to let the algorithm control when to request feedback, and to allow this feedback period to vary in some range not easily described by any constant B. For example, allowing the algorithm to control parallelism is desirable in situations where the cost of executing the algorithm's queries to the oracle depends on both the number of batches and the number of individual actions or experiments in those batches. For example, in a chemical experiment, in which cost is a weighted sum of the time to complete the batch of reactions and the cost of the reagents needed for each individual experiment, this is the case. In such a case, confronting an initial state of relative ignorance about the reward function, it may be desirable to avoid using a wasteful level of parallelism.

In order to address these concerns, it may be required that the mapping fb[t] and the sequence of actions selected by the algorithm GP-BUCB be such that there exists some bound C, holding for all $t \geq 1$ and $x \in D$, on $I(f(x); y_{fb[t]+1:t-1}|y_{1:fb[t]})$, for the hallucinated information as of round t with respect to any value f(x). This requirement on fb[t] in terms of C may appear stringent, but it can be easily satisfied by on-line, data-driven construction of the mapping fb[t] after having pre-selected a value for C.

The GP-AUCB algorithm explained below controls feedback adaptively through pre-selecting a value of C limiting the amount of hallucinated batch information. The GP-AUCB algorithm chooses fb[t] online, using a limit on the amount of information hallucinated within the batch. Such adaptive batch length control is possible because the amount of hallucinated information may be measured online using the following equation, even in the absence of the observations themselves.

$$I(f; y_A | y_s) = \sum_{t'=fb[t]+1}^{T} \log(1 + \sigma_n^{-2}\sigma_{t'-1}^2(x'))$$

When this value exceeds a pre-determined constant C, the algorithm terminates the batch, setting fb for the next batch to the current t (i.e., fb[t+1]=t), and waits for the oracle to return values for the pending queries. The algorithm, GP-AUCB, is shown in the code below.

```
Input: Decision set D, GP prior µ0, σ0, kernel function k(.,.), information
gain
threshold C.
Set fb[t'] = 0_t' ≥ 1, G = 0.
for t = 1, 2, ...., T do
  if G > C then
    Obtain y_t' = f(x_t') + ε_t' for t' ∈ {fb[t − 1], ..., t − 1}
    Perform Bayesian inference to obtain µ_{t−1} (.)
    Set G = 0
    Set fb[t'] = t −1 ∀t' ≥ 1
  end if
  Choose x_t = argmax_{x∈D} [µ_{fb[t]}(x) + β_t^{1/2} σ_{t−1} (x)]
  Set G = G + ½ log (1 + σ_n^{−2} σ_{t−1}^2 (x_t))
  Compute σ_t(.)
end for
```

The GP-AUCB algorithm can also be employed in the delay setting, but rather than using the hallucinated information to decide whether or not to terminate the current batch, the algorithm chooses whether or not to submit an action in this round; the algorithm submits an action if the hallucinated information is ≤C and refuses to submit an action ("balks") if the hallucinated information is >C.

In comparison to the GP-BUCB algorithm described above, by concerning itself with only the batches actually chosen, rather than worst-case batches, the GP-AUCB algorithm eliminates the requirement that C be greater than the information which could be gained in any batch, and thus makes the information gain bounding argument less conservative. For such a C:

$$I(f(x); y_{fb[t]+1:t-1}|y_{1:fb[t]}) \leq I(f; y_{fb[t]+1:t-1}|y_{1:fb[t]}) \leq C;$$
$$\forall x \in D; \forall t \geq 1.$$

Because of the monotonicity of conditional mutual information, the information gain locally under the GP-AUCB algorithm is bounded by the information gain with respect to f as a whole, which is constrained to be ≤C by the stopping condition. Using such an adaptive stopping condition and the corresponding value of $\beta_t$, the equality $$\log\left(\frac{\sigma_{fb[t]}(x)}{\sigma_{t-1}(x)}\right) = I(f(x); y_{fb[t]+1:t-1} | y_{1:fb[t]})$$

may be used to maintain a guarantee of confidence interval correctness for batches of variable length. In particular, the batch length may possibly become quite large as the shape of f is better and better understood and the variance of $f(x_t)$ tends to decrease. Further, if exploratory actions are chosen, the high information gain of these actions contributes to a relatively early arrival at the information gain threshold C and thus relatively short batch length, even late in the algorithm's run.

Figure 4:
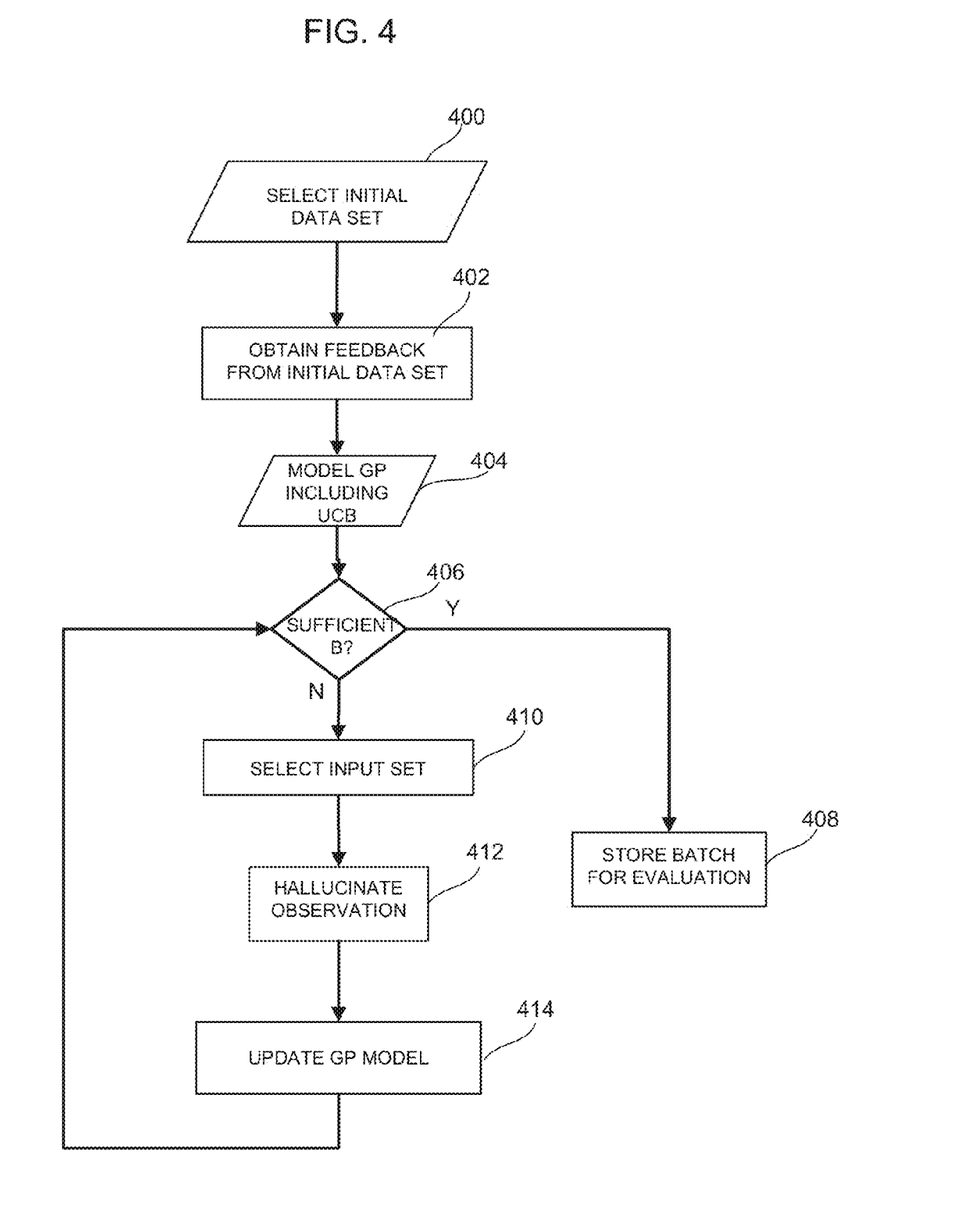
FIG. 4 is a flow diagram of the process run by the system in FIG. 1 to select batches of data for parallel processing.

In this way, the batch length is chosen in response to the algorithm's need to explore or exploit as dictated by the decision rule (Equation (4) associated with the GP-BUCB algorithm, not simply following a monotonically increasing schedule.

This approach allows the regret of GP-AUCB to be bounded for both the batch and delay settings. If the GP-AUCB is employed with a specified constant value C, for which $I(f;y_{fb[t]+1:t-1}|y_{1:fb[t]}) \leq C$; $\forall t \in \{1, \ldots T\}$, a specified constant, δ, in the interval (0,1) one of the three conditions of the above explained maximum regret and under resulting feedback mapping fb[t], $\beta_t = \exp(2C)\alpha_{fb[\tau]}$, $\forall \tau \in \{1, \ldots T\}$, then the inequality, $R_T \leq \sqrt{C_1 T \exp(2C)\alpha_T \gamma_T} + 2$ holds with a probability at least 1-δ.

C may be selected to deliver batches with a specified minimum size $B_{min}$. To ensure this occurs, C may be set such that $C > \gamma_{Bmin-1}$, i.e., no set of queries of size less than $B_{min}$ could possibly gain enough information to end the batch. Further, C is chosen such that $C < (B_{min})$, it is possible to select a batch of size $B_{min}$ which does attain the required amount of information to terminate the batch, and thus $B_{min}$ may be thought of as the minimum batch size which could be produced by the GP-AUCB algorithm.

It is also possible to choose a very small value for the constant C and produce nearly sequential actions early, while retaining late-run parallelism and producing a very low regret bound. This can be seen if $B_{min}$ is set to 1 and such a C must satisfy the inequalities $\gamma_0 = 0 < C < \gamma_1$, i.e., C can be a very small positive number. With regard to action selection, choosing C to be a small positive value results in the GP-AUCB algorithm beginning its run by acting sequentially, since most actions gain information greater than C. However, the algorithm has the potential to construct batches of increasing length as $T \to \infty$. Even assuming the worst case, that all observations are independent and each gains the same amount of information, the batch length allowed with a given posterior is lower-bounded. If the algorithm converges toward the optimal subset then the variances of the actions selected can be expected to generally become very small, producing batches of very long length, even for very small C. Choosing C as a small positive value thus produces the potential for naturally occurring late-run parallelism for very little additional regret relative to GP-UCB.

It is also possible to calculate the ratio $\sigma_{fb[t]}(x)/\sigma_{t-1}(x)$ directly, for every x in D, if the algorithm remembers $\sigma_{fb[t]}(x)$ for each x. By setting a value C, and stopping the batch selection if $\exists x \in D: \sigma_{fb[t]}(x)/\sigma_{t-1}(x) > \exp(C)$, the algorithm also ensures the confidence intervals used by the GP-BUCB decision rule contain f with high probability. This is a variant algorithm, termed GP-AUCB Local, for the local ratio checking, and this algorithm's regret is also bounded by Theorem 1. The GP-AUCB Local algorithm may have advantages in cases where many observations are needed to acquire a good initial understanding of f.

Importantly, the GP-AUCB Local algorithm can take advantage of the efficient upper bounding lazy variance technique discussed above, despite the fact that the local stopping condition nominally requires all of the variances to be calculated every round; this is because $I(f(x); y_{fb[t]+1:t-1} | y_{1:fb[t]}) \leq I(f; y_{fb[t]+1:t-1} | y_{1:fb[t]})$, that is, the local information gain is bounded by the global information gain, and further, the global information gain may be easily calculated on-line, using only the posterior variances of the actions actually selected, which are available to the lazy algorithm. If the GP-AUCB Local algorithm is set to stop when C or more information has been acquired with respect to f(x) for any x in D, checking of this condition is only necessary when at least C or more information has been acquired within the batch with respect to f as a whole. Thus, the GP-AUCB Local algorithm may be run lazily until the global information gain reaches C, at which point it must be run non-lazily for the remainder of the batch.

Thus, the GP-BUCB algorithm is able to handle parallel exploration problems (batches of B experiments executed concurrently). This approach generalizes the GP-UCB approach to the parallel setting. Near linear speedup is possible for many commonly used kernel functions as long as the batch size B grows at most polylogarithmically in the number of rounds T, the GP-BUCB regret bounds only increase by a constant factor independent of B as compared to the known bounds for the sequential algorithm. The GP-BUCB algorithm may also be drastically accelerated by using lazy evaluations of variance. The GP-BUCB algorithm is also able to handle delayed feedback problems (where each decision can only use feedback up to B rounds ago or where there are at most B−1 observations are pending). The GP-AUCB algorithm handles the same cases and provides the same regret bounds, with batches or delay queues of variable length, controlled by the algorithm in accordance with the data.

The above mentioned GP-BUCB and GP-AUCB algorithms are generally applicable for any application which requires multiple rounds/batches, where each experiment is cheap but will take too long to be practical before the choice of the next location, and where the evaluation of each experiment is costly. Some possible applications of the batch version of the algorithm include the selection of reagent combinations for chemical experiments, the selection of home-use electrical stimuli in such systems as the MyStim home epidural electrostimulation (EES) controller manufactured by Medtronic. Similarly, the GP-BUCB and GP-AUCB algorithms are suitable for applications like image annotation where many human annotators are available, but the amount of time required to generate an annotation is comparatively long with respect to the run time of the algorithm. Additional applications may include robotics, fluid dynamics analysis, machine learning, biosystems modeling, chemical modeling, finite element analysis, etc.

Additional applications of the delay version of the GP-BUCB and GP-AUCB algorithms include cases where the sequence of experiments is running continuously, but the evaluation of each experiment may be lengthy. For example the clinical selection of spinal cord therapy epidural electro-stimulation (EES) configurations, in which Electromyography (EMG) is used as one of the primary measurements, but the processing of this EMG (and other sensor) data is time-consuming, on the order of the testing time for one to two experimental stimuli. Thus, additional processing may be performed based on delayed feedback from previous tests without having to wait for intervening processing to be finished. The ability to select EES configurations without processing EMG data is useful. The manual image annotation application mentioned above for the batch case could also be formulated in the delay case, where each annotator finishes working on their assigned image asynchronously, and relatively slowly. This capability would be very useful in a variety of on-line applications.

The application of the system 100 may be made in epidural electro-stimulation (EES) for spinal cord injury therapy alone or in combination with other interventions such as pharmacological agents and motor training. To overcome variation with respect to patients, injuries, surgical placement, and spinal cord plasticity, electrode arrays of increasing sophistication are being developed. Optimizing the stimuli delivered by these EES arrays is difficult as the numerous parameters yield large and complex stimulus spaces. A further complication is a lack of reliable predictive models for the physiological effects of a given stimulus, necessitating physical experiments with the EES system and patient. Another related application may be using the GP-AUCB algorithm to control costly finite element simulations of the electric field and voltage distribution in the spinal cord under epidural electro-stimulation, which would then be coupled to simulations of neurons.

A variant of the GP-BUCB algorithm explained above may be used to actively optimize an EMG-based metric of lower spinal cord function in 4 complete spinal rats during 3-15 experimental sessions. The algorithm is used to choose cathode/anode pairs of electrodes for EES among 7 (n=2, array composed of parallel wires) or 27 contacts (n=2, flexible parylene/platinum array) to maximize reward, defined as the peak-to-peak (PtP) amplitude of the evoked potential in the left tibialis anterior muscle in the interval 4.5-7.5 ms post-stimulus. This latency implies a single interneuronal delay, not direct activation of the motoneurons.

The amplitude is treated as a surrogate for the ability of the spinal interneurons to transduce sensory information into muscle responses and assume that supplying effectively transduced stimuli provides activity-based therapeutic excitation of the lower spinal cord. The GP-BUCB algorithm models the response function over stimuli and time as drawn from a Gaussian process, a probability distribution over functions. It then selects experimental stimuli to balance exploring poorly understood regions of the stimulus space and exploiting stimuli that produce strong responses.

The performance of the GP-BUCB algorithm under this reward metric typically achieves superior performance in terms of time-averaged reward and parity in terms of best single PtP response obtained in comparison an expert human experimenter's simultaneous efforts. Further, despite being initially unaware of the spinal location of effective stimuli, the algorithm learns a human-interpretable "shape" of the response function via active experimentation, allowing discovery of the gross functional organization of the spinal cord.

Another application may be in the field of automated vaccine design. The GP-BUCB algorithm may evaluate a database which describes the binding affinity of various peptides with a Major Histocompatibility Complex (MHC) Class I molecule. This is of importance when designing vaccines to exploit peptide binding properties. Each of the peptides is described by a set of chemical features in $R^{45}$. The binding affinity of each peptide, which is treated as the reward or payoff, is described as an offset IC50 value. The experiments used an isotropic linear ARD kernel fitted on a different MHC molecule from the same data set.

Figure 3:
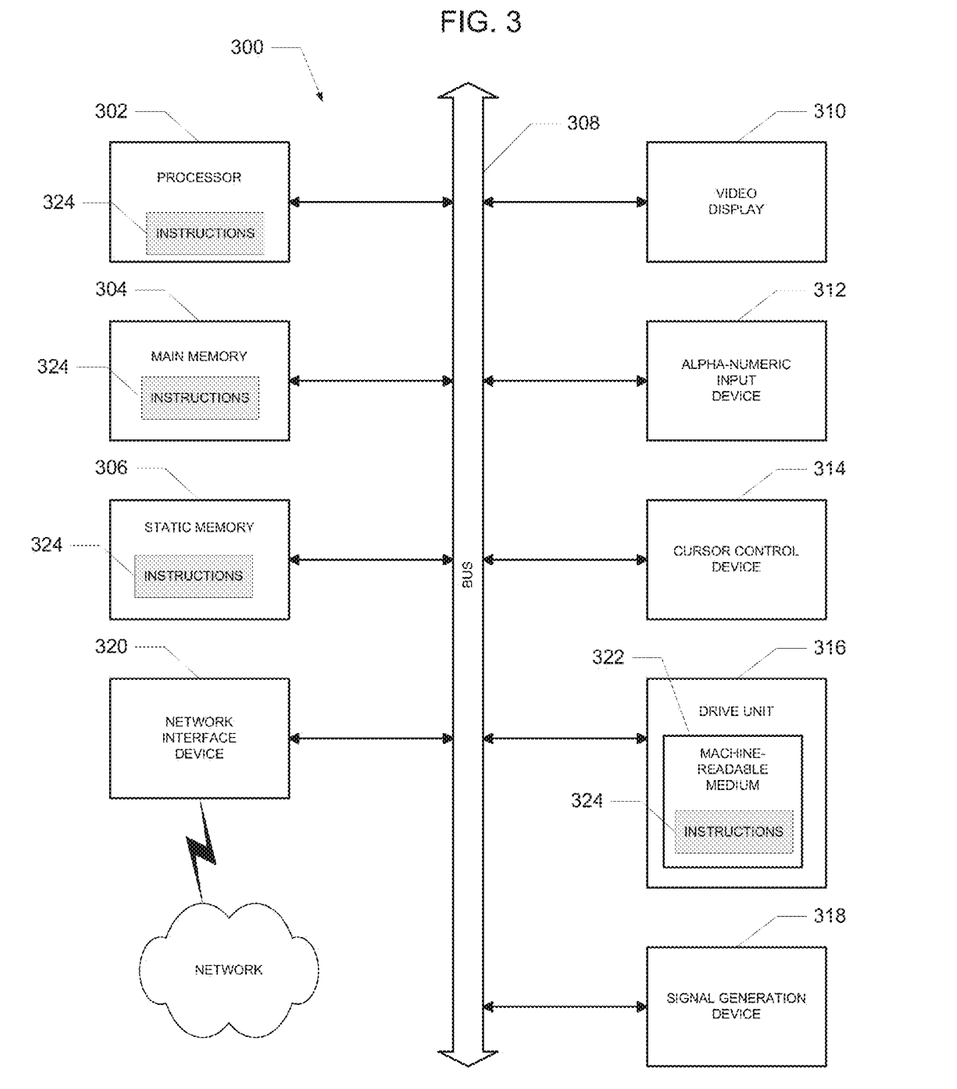
FIG. 3 is a block diagram of an example computing device in the system in FIG. 1.

An example computer system 300 in FIG. 3 includes a processor 302 (e.g., a central processing unit (CPU), a graphics processing unit (GPU), or both), a main memory 304, and a static memory 306, which communicate with each other via a bus 308. The computer system 300 may further include a video display unit 310 (e.g., a liquid crystal display (LCD) or a cathode ray tube (CRT)). The computer system 300 also includes an input device 312 (e.g., a keyboard), a cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions (e.g., software 324) embodying any one or more of the methodologies or functions described herein. The instructions 324 may also reside, completely or at least partially, within the main memory 304, the static memory 306, and/or within the processor 302 during execution thereof by the computer system 300. The main memory 304 and the processor 302 also may constitute machine-readable media. The instructions 324 may further be transmitted or received over a network.

While the machine-readable medium is shown in an example to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding, or carrying a set of instructions for execution by the machine and that cause the machine to perform any one or more of the methodologies of the various embodiments, or that is capable of storing, encoding, or carrying data structures utilized by or associated with such a set of instructions. The term "machine-readable medium" can accordingly be taken to include, but not be limited to, solid-state memories, optical media, and magnetic media.

A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory.

Furthermore, each of the computing devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA), and the like, programmed according to the teachings as described and illustrated herein, as will be appreciated by those skilled in the computer, software, and networking arts.

In addition, two or more computing systems or devices may be substituted for any one of the computing systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The operation of the example system 100 shown in FIG. 1, which may be controlled on the example workstation, will now be described with reference to FIG. 1 in conjunction with the flow diagram shown in FIG. 4. The flow diagram in FIG. 4 is representative of example machine readable instructions for implementing selection of a batch of input data for parallel evaluation. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 4 may be implemented manually. Further, although the example algorithm is described with reference to the flowchart illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 4 is a flow diagram of the process of for implementing selection of a batch of input data for parallel evaluation with a function. In the process, the system 100 selects an initial set of inputs from the dataset of available input data stored in the database 102 (400). The initial set of inputs is constructed via uncertainty sampling and is selected non-adaptively without prior feedback. Feedback is obtained from the initial set of inputs with the function (402). The Gaussian process module 104 then provides the Gaussian process posterior and a confidence bound decision rule conditioned on the feedback from the initial set of inputs. (404). The Gaussian process module 104 thus models the function as drawing from a Gaussian process, determines a means and a variance of the modeled function via observations and determines an upper confidence bound from the means and variance. The batch selection engine 106 determines whether there are sufficient sets of inputs, B, in the batch (406). If there are sufficient inputs, the batch is stored and is complete for evaluation by the function evaluation engine 108 (408). The input data of the batch is evaluated in parallel with the function and the resulting determined data outputs are stored in a memory device such as the output memory device 110.

If there are more sets of inputs needed, the batch selection engine 106 selects a set of inputs based on the Gaussian process posterior and a confidence bound decision rule (410). The batch selection engine 106 then hallucinates a corresponding observation based on the selected action (412). The batch selection engine 106 then updates the Gaussian process model using the hallucinated observations (414). The batch selection engine 106 then loops back to determine whether sufficient sets of inputs, B, have been assigned to the batch (406).

Each of these embodiments and obvious variations thereof is contemplated as falling within the spirit and scope of the claimed invention, which is set forth in the following claims.

What is claimed is:

1. A method of selecting a batch of input data from available input data for parallel evaluation by a function, the method comprising:
   via a controller, modeling the function as drawn from a Gaussian process;
   using observations to determine a mean and a variance of the modeled function;
   determining an upper confidence bound from the determined mean and variance;
   via the controller, applying a decision rule to select input data from the available input data to add to the batch of input data, wherein the selection is based on a domain-specific time varying parameter;
   hallucinating intermediate observations for a plurality of observations not yet available within the batch;
   via the controller, using the hallucinated observations with the decision rule to select subsequent input data from the available input data for the batch of input data via the controller;
   via the controller, evaluating the input data of the batch in parallel with the function; and
   storing the resulting determined data outputs in a memory device.

2. The method of claim 1, wherein the input data relates to peptide binding properties for automated vaccine design, and the data outputs are corresponding binding affinities.

3. The method of claim 1, wherein the input data relates to electrodes for electrical stimulation and locations on a spinal cord, and the data outputs relate to reaction to stimulation.

4. The method of claim 1, wherein the decision rules trades off exploitation with exploration in selecting the input data to add to the batch.

5. The method of claim 1, wherein a regret bound is limited by initializing the modeling with a finite set of observations.

6. The method of claim 1, further comprising selecting a second batch of input data for evaluation with the function after evaluating the input data of the batch, wherein the second batch of input data is selected with feedback from the evaluation of the first batch of data.

7. The method of claim 1, wherein the input data for the batch are determined according to:

$$X_t = \underset{x \in D}{\mathrm{argmax}}[\mu_{fb[t]}(x) + \beta_t^{1/2} \sigma_{t-1}(x)]$$

wherein X is the plurality of data inputs for the batch, x is input data of the batch, $\beta_t$ is the domain-specific time-varying parameter to trade off exploitation and exploration, $\mu_{fb[t]}(x)$ is a posterior mean and $\sigma_{t-1}(x)$ is a standard deviation.

8. The method of claim 7, wherein confidence intervals associated with the domain-specific time-varying parameter, $\beta_t$ contain the true function with high probability.

9. The method of claim 7, wherein variance is not recalculated for the next x in the batch that lies within the argmax.

10. The method of claim 1, wherein the number of data inputs in the batch has a variable length determined by the information gained by the evaluation of the function.

11. The method of claim 1, wherein the number of data inputs in the batch has a variable length determined by on posterior uncertainty.

12. The method of claim 1, wherein the domain-specific time-varying parameter is scheduled according to exp(2C) $\alpha_{fb[t]}$ wherein C is an upper bound on the conditional mutual information gain from the batch and $\alpha_{fb[t]}$ is chosen according to the domain and requirements of a regret bound.

13. The method of claim 1, wherein the domain-specific time-varying parameter is offset by an additive or subtractive value.

14. The method of claim 1, further comprising:
   selecting an initialization set from the available input data by uncertainty sampling without prior feedback;
   obtaining feedback outputs from the initialization set with the function; and
   applying the outputs to the Gaussian process.

15. A system for determining a batch of input data from available input data for parallel evaluation by a function, the system comprising:
   a storage device storing a database including the available input data;
   a controller coupled to the storage device, the controller operable to:
     model the function as drawn from a Gaussian process;
     use observations to determine a mean and a variance of the modeled function;
     determine an upper confidence bound from the determined mean and variance;
     apply a decision rule to select input data from the available input data to add to the batch of input data, wherein the selection is based on a domain-specific time varying parameter;
     hallucinate intermediate observations for a plurality of observations not yet available within the batch;
     select subsequent input data from the available input data for the batch of input data using the hallucinated observations with the decision rule;
     evaluate the input data of the batch in parallel with the function; and
     store the resulting determined data outputs.

16. The system of claim 15, wherein the decision rule trades off exploitation with exploration when selecting the input data for the batch.

17. The system of claim 15, wherein a regret bound is limited by initializing the function model with a finite set of observations.

18. The system of claim 15, wherein the controller is further operable to select a second batch of input data for evaluation with the function, wherein the second batch of input data is selected with feedback from the evaluation of the first batch of data.

19. The system of claim 15, wherein the input data for the batch is determined according to:

$$X_t = \underset{x \in D}{\operatorname{argmax}}[\mu_{fb[t]}(x) + \beta_t^{1/2}\sigma_{t-1}(x)]$$

wherein X is the plurality of data inputs for the batch, x is input data of the batch, $\beta_t$ is the domain-specific time-varying parameter to trade off exploitation and exploration, $\mu_{fb[t]}(x)$ is a posterior mean and $\alpha_{t-1}(x)$ is a standard deviation.

20. The system of claim 19, wherein confidence intervals associated with the domain-specific time-varying parameter, $\beta_t$, contain the true function with high probability.

21. The system of claim 19, wherein variance is not recalculated for the next x in the batch that lies within the argmax.

22. The system of claim 15, wherein the number of data inputs in the batch has a variable length determined by the information gained by the evaluation of the function.

23. The system of claim 15, wherein the number of data inputs in the batch has a variable length determined by on posterior uncertainty.

24. The system of claim 15, wherein the domain-specific time-varying parameter is scheduled according to exp(2C) $\alpha_{fb[t]}$ wherein C is an upper bound on the conditional mutual information gain from the batch and $\alpha_{fb[t]}$ is chosen according to the domain and requirements of a regret bound.

25. The system of claim 15, wherein the domain-specific time-varying parameter is offset by an additive or subtractive value.

26. A non-transitory, machine readable medium having stored thereon instructions for selecting a batch of input data from available input data for parallel evaluation by a function, which when executed by at least one machine processor, cause the machine to:
model the function as drawn from a Gaussian process;
use observations to determine a mean and a variance of the modeled function;
determine an upper confidence bound from the determined mean and variance;
apply a decision rule to select input data from the available input data to add to the batch of input data, wherein the selection is based on a domain-specific time varying parameter;
hallucinate intermediate observations for a plurality of observations not yet available within the batch;
select subsequent input data from the available input data for the batch of input data using the hallucinated observations with the decision rule; and
evaluate the input data of the batch in parallel with the function.

* * * * *

UNITED STATES PATENT AND TRADEMARK OFFICE
CERTIFICATE OF CORRECTION

PATENT NO. : 9,342,786 B2
APPLICATION NO. : 13/919757
DATED : May 17, 2016
INVENTOR(S) : Andreas Krause et al.

Page 1 of 1

It is certified that error appears in the above-identified patent and that said Letters Patent is hereby corrected as shown below:

In the specification,

Column 1, line 14, under FEDERAL SUPPORT STATEMENT:

"The subject matter of this invention was made was made with government support under NS062009 awarded by the National Institutes of Health and under IIS0953413 awarded by the National Science Foundation and FA8650-11-1-7156 awarded by USAF/ESC. The government has certain rights in the invention."

should read as "This invention was made with government support under Grant No. NS062009 awarded by the National Institutes of Health, and under Grant No. IIS0953413 awarded by the National Science Foundation and under Grant No. FA8650-11-1-7156 awarded by AFMCLO/JAZ. The government has certain rights in the invention."

Signed and Sealed this
Second Day of August, 2016

Michelle K. Lee
*Director of the United States Patent and Trademark Office*